July 26, 1966

D. B. PALL ET AL 3,262,564

DUAL VALVE, DUAL FILTER ELEMENT, CONSTANT
FLOW FILTER ASSEMBLY

Filed May 24, 1963

United States Patent Office 3,262,564
Patented July 26, 1966

3,262,564
DUAL VALVE, DUAL FILTER ELEMENT, CONSTANT FLOW FILTER ASSEMBLY
David B. Pall, Roslyn Estates, and Bernard F. Silverwater, Plainview, N.Y., assignors to Pall Corporation, Glen Cove, N.Y., a corporation of New York
Filed May 24, 1963, Ser. No. 283,005
17 Claims. (Cl. 210—90)

This application is a continuation-in-part of application Serial No. 264,160, filed March 11, 1963.

This invention relates to filter assemblies, and more particularly to filter assemblies especially designed for use with hydraulic systems of aircraft, to remove a substantial proportion of very fine incident particles.

So many extraordinary demands are made upon the hydraulic systems of aircraft, that the surprising thing is not that there is an occasional failure, but that the systems are as effective as they are. The hydraulic fluids used must withstand temperatures ranging from −65° F. to as high as 275° F., and occasionally even higher, and must be completely flowable and operative in the system under these conditions.

Wear and abrasion of parts result in the production of very fine particles, usually 0.05 to 1 micron in diameter. While these fine particles are so small that individually they cause no obstruction, there is nonetheless a tendency for sedimentation of such particles in regions where the rate of flow is rather low and for collection of such particles in the small (often 5 microns or less) clearances in pump pistons, servo valves, actuators, valves, and other components. In the course of time, serious obstructions can be built up even from such small particles. Indeed, it is the very fine particles that are usually responsible for pump failure in such systems, nowadays, since these are the particles not removed by conventional filters.

Maintenance of a clean hydraulic fluid of course requires efficient filtration. In this respect, the fine particles present a special problem, because it is quite difficult to prepare a filter element capable of removing very small particles that has a sufficient flow capacity to meet the flow requirements of the system. In normal flight, a flow of hydraulic fluid of the order of 5 gallons per minute or less may be sufficient, but whenever the landing gear flaps or other large hydraulically operated gear is operated, a higher flow rate can be required, considerably in excess of 5 gallons per minute under certain conditions. Flow capacity of a filter is of course a function of surface area, and in the limited space requirements of aircraft, it has not until very recently been possible to provide a filter element sufficiently rugged for hydraulic system service and having a fine enough incident particle removal rating, and a high enough flow capacity, to meet these requirements. The result has been that in aircraft, at least, it has not been possible to design a filter element that is capable of removing a substantial proportion of very fine incident particles.

In accordance with the invention, a filter assembly is provided that is capable of removing a substantial proportion of very fine incident particles, as small as 0.05 micron in diameter, as well as nearly all incident particles over 0.45 micron in diameter, and all incident particles over 3 microns in diameter, and that is capable of supplying a flow rate as high as may be desired, without any real upper limit, except that imposed by conventional filter elements now in use. A filtered flow is provided at all flow rates, but at flow rates in excess of a predetermined maximum, only a portion of the flow is filtered through the primary filter element, which is capable of removing all particles as small as 3 microns in diameter. The remainder is diverted by a flow control valve assembly, in accordance with the invention, through a secondary filter of normal flow capacity but capable only of removing most of the incident particles as small as 1.5 microns or larger in diameter, and all incident particles over 15 microns in diameter. The normal flow, plus a safe margin, through the primary filter element is the maximum required for normal operational flow in the system in which the element is installed. Only when extraordinary requirements are made upon the flow, beyond this maximum, does the flow control valve assembly divert the incremental portion of the flow through the secondary filter element. Since such extraordinary flow requirements are usually made only for short periods, up to 2 to 3% of the total flight time, the filter assembly of the invention effectively keeps the hydraulic fluid substantially free from particles larger than 0.45 micron in diameter, since any such particles that may enter the fluid during the times of extraordinary flow are removed later in the course of normal flow.

As a further feature, the filter assembly of the invention provides for maintenance of a filtered flow through the secondary filter element whenever the primary element is clogged or so obstructed that the flow-through results in a pressure differential across that element above a predetermined minimum. In this event, also, the flow control valve assembly provided diverts through the secondary filter element flow above that which the partially or fully clogged primary filter element can pass.

A second by-pass as an optional feature is provided for the secondary filter element, so that when this element becomes clogged, or so obstructed as to increase the pressure differential across it to above a predetermined minimum, then all flow through the filter by-passes both the primary and the secondary filter elements. Normally, there is ample time after the primary element has become obstructed for the filter element to be serviced before the secondary filter element becomes clogged. Thus, the second by-pass line would come into use only in the event of an emergency of rather unusual character.

In certain systems, intolerant of any contaminant above 15 microns, it will be preferable to omit the by-pass valve around the secondary element, in which event the secondary element is preferably fabricated with internal support such that it will withstand full system pressure as a differential pressure across it.

Pressure indicators can be provided, indicating the reaching of a predetermined pressure differential across the primary filter element, and across the secondary filter element, so that an indication is given to the operator that the primary or secondary filter element or both have become clogged, and require servicing.

The filter assembly of the invention can be used in a fluid line of any type. It is especially designed for use in a tank reservoir or supply chamber to which it is capable of delivering filtered flow without surging or turbulence.

For control of the diversion of fluid from the primary filter element at flow rates above the predetermined maximum, as well as diversion whenever the primary filter element becomes obstructed so that the pressure differential across it reaches a predetermined minimum, there is provided a flow valve assembly comprising a valve of the orifice or venturi type, limiting flow through to a maximum value, in combination with a pressure-sensitive valve so designed as to be actuated by an increase in the velocity of flow through the orifice or venturi valve. Since this increase in velocity is proportional to the amount of fluid, and the resultant static pressure on the enclosed chamber side of the valve is reduced in proportion to the square of the velocity, the resultant static pressure difference between the inlet and chamber sides of the pressure-sensitive valve actuate the valve, which results in the pressure-sensitive valve being responsive to changes in flow volume and consequently to changes in flow demand made upon the filter assembly of the invention. The orifice or venturi valve is placed in the line of flow between the inlet to the filter assembly and the primary filter element, and preferably, in an inlet passage, while the pressure-sensitive valve is placed in the line of flow between the inlet and the secondary filter element.

The orifice or venturi valve has an orifice or throat such as a venturi considerably reducing the diameter of the passage available for flow, such as in the inlet passage, and as a consequence of this reduction in diameter, the velocity of flow through the valve orifice increases. A small hole or passage communicates the low static pressure at the venturi throat to a closed pressure chamber on one side of the pressure-sensitive valve, which is desirably in the form of a Belleville washer or spring disc, forming one wall of the chamber, and within which the washer or disc deflects between open and closed positions. The other side of the pressure-sensitive valve, such as the washer or disc, is exposed to fluid pressure in the inlet line. The valve is biased in the closed position, and remains stationary, in position against the valve seat, whenever the force against it due to fluid flow or pressure at the inlet side is less than the force in the opposite direction, which is the total of the force exerted by the fluid pressure in the closed pressure chamber and the biasing force holding it in the closed position.

The total pressure in the fluid remains constant, and is the sum of the static pressure and the velocity pressure. Hence, an increase in the velocity pressure at any point will result in a decrease in the static pressure at that point. Under normal flow conditions, a steady state exists in which the force due to the high static pressure on the inlet side of the pressure-sensitive valve is less than the total force holding the valve in place, and the valve remains stationary. However, when the flow volume and hence rate increase, the velocity of flow through the orifice increases, and results in a reduction in static pressure at the orifice, which is communicated to the chamber and reduces the force tending to hold the valve stationary against the inlet flow. The valve is designed to be opened whenever the reduction in static pressure across the orifice and therefore in the pressure chamber falls below a predetermined minimum.

The pressure-sensitive valve is so positioned in the fluid line, such as the inlet passage, as under normal flow conditions to close off a line leading to the secondary filter element. The result is that all flow must pass through the orifice or venturi valve into the primary filter element. At a predetermined pressure differential in static pressure between the valve face on the inlet side of the pressure-sensitive valve, and the pressure chamber on the other side of that valve, the minimum value of which is determined by the flow requirements of the system, the valve is actuated in a manner to open the passage between the inlet and the secondary filter element.

With appropriate design of the pressure-sensitive valve, the amount of opening can be proportional to the magnitude of the pressure differential, and thus the amount of diversion of flow to the secondary element can be made directly dependent upon the rate of flow. While the valve is open, flow to the primary filter element continues at the normal but maximum rate through the orifice or venturi valve. Thus, at all positions of the flow valve assembly, flow is supplied to and through the primary filter element, while it remains unobstructed. Hence, at flow rates above the predetermined maximum, there is flow through both the primary and the secondary filter elements. The filter is thus able to accommodate itself to the increased demand for flow, and all of the flow through the filter assembly is still filtered.

A preferred embodiment of the flow valve assembly of the invention comprises structurally an orifice or venturi, a closed pressure chamber communicating with the orifice or venturi, and a spring disc reciprocatingly mounted in the closed pressure chamber and biased against a valve seat in a position to close off a line to the secondary filter element. The spring disc has one face exposed to fluid pressure in the closed pressure chamber and the other face exposed to fluid pressure in the inlet. The orifice connects the inlet with the passage leading to the primary filter element in all positions of the valve. The pressure exerted by the disc against the valve seat can be adjusted as required by appropriate selection of the amount of bow and the dimensioning of the disc, as well as the metal of which it is made, and the dimensioning of the orifice or venturi is matched with the compressive force of the spring disc, and the dimensioning of the pressure chamber and surface area of the disc exposed therein to fluid pressure, so as to obtain actuation of the pressure-sensitive valve at the predetermined pressure differential in static pressure across the orifice.

While a spring biased disc is preferred, magnetic, electrostatic or electromagnetic biased discs can also be used. In the case of magnetic or electrostatic discs, twin magnets can be used, at each extremity of reciprocation of the disc, and the disc itself can be magnetic, oriented so as to be attracted to the magnet holding the disc in the closed position and repelled by the magnet holding the disc in the open position, and both magnets are so placed that the disc at each extremity is within the field of both magnets. Thus, reseating of the disc in the closed position is ensured when the flow is returned to normal. In the case of electromagnetic biasing means, the coil windings can be varied to provide the required biasing forces.

In a preferred embodiment, a relief valve is provided which is actuated whenever the fluid pressure at the inlet exceeds the pressure in the passage to the secondary filter element on the other side of the primary filter element by a predetermined amount. Thus, in the preferred embodiment, whenever the fluid's passage through the primary filter element becomes obstructed, so that the total pressure differential between the inlet passage and the passage to the secondary filter element across the disc exceeds a predetermined maximum, the relief valve is actuated, exposing the line to the secondary filter element, by-passing the primary element, and filtered flow continues by way of the secondary filter element, on an emergency basis until the primary element can be serviced.

Preferably, a Belleville washer or spring disc valve is used to control relief flow through the secondary filter element in case of plugging or obstruction, to a flow-reducing degree, of the primary filter element.

Those skilled in the art are aware of the parameters to be taken into account in determining the diameters of orifices or venturi passages. The exact dimensions for these and for the pressure-sensitive valve disc faces must be determined for each particular system, but this is readily accomplished by standard design and calculation.

The flow valve assembly can be constructed of any durable material inert to the fluid being circulated through the system. Metal valve assemblies, such as those made of aluminum, stainless steel, and other stainless alloys, are preferred, but it is also possible to fabricate the valve assemblies from synthetic polymers and cellulose derivatives, such as polytetrafluoroethylene, polypropylene, polyethylene, polystyrene, nylon, polyoxymethylene, acrylonitrile rubbers, and fluorocarbon rubbers.

The primary filter element of the invention is selected to meet the system requirements for incident particle removal. As has been stated, hydraulic systems of aircraft may require the removal of all incident particles as small as 3 microns in diameter. However, the primary filter element of the invention can be selected to remove a proportion of even smaller particles, down to 0.05 micron in diameter, if required, or only considerably larger particles, if removal of such a high proportion of small particles is unnecessary. There is no upper limit, but filters having the ability to remove all particles of from 3 to 10 microns in diameter are generally useful.

As the primary filter element, any filter material can be employed. Sheet filter material can be used, such as porous sheets made of sintered particulate material, and wire mesh and sinter-bonded wire mesh, disclosed in U.S. Patents Nos. 2,925,650 and 3,049,796, in which the wires or particles are made of metals or natural or synthetic plastic materials, such as stainless steel, aluminum, ceramic materials, polyvinyl chloride, polyethylene, polypropylene, polystyrene, and polytetrafluoroethylene.

For removal of all incident particles as small as 3 microns in diameter, the primary filter element should have a microporous structure in which no pore is larger than about 10 microns, and the microporous structure should have a high voids volume, preferably of at least 75%. A preferred microporous sheet material for use in the manufacture of the primary filter element is a bat or sheet having deposited therein or thereon and bonded thereto a layer having the desired ultrafine or microporous dimensions and voids volume. Preferred embodiments of microporous materials are described in U.S. application Serial No. 215,151 filed August 6, 1962, and have a maximum pore diameter of less than about 10 microns and an average pore diameter of about 0.005 to 3 microns. Also useful are the microporous materials prepared in accordance with U.S. application Serial No. 98,595, filed March 27, 1961, and now U.S. Patent No. 3,238,056 and U.S. application Serial No. 74,130, filed December 6, 1960, and now U.S. Patent No. 3,158,532.

Because filter materials having such low micron removal ratings have a relatively low flow capacity, it is preferred to form the primary filter element in pleats, convolutions or corrugations, so as to provide a greater surface area in a small volume.

The secondary filter element is selected primarily for flow capacity, so as to pass the required volume of fluid per unit time under the maximum flow demands of the system, and is preferably also selected so as to give the smallest particle removal ratings obtainable at such flow capacity.

The particle removal rating of the secondary filter element is in no way critical, and can range from 1 to 50 microns or higher, depending on the system parameters. Particles passed in flow through the secondary filter element are temporarily in the system in any event, since the primary filter element cleans up such particles during normal flow, even when the flow through the secondary filter element is due to plugging of the primary filter element.

If the primary element is made of material (for example, sintered powder, felt or paper) which may release particles or fibers from its downstream surface, the secondary filter should preferably be fine enough to remove all such particles or fibers.

Secondary filter elements are available, capable of removing 98% of particles as small as 1.5 microns in diameter, which have the required flow capacity. Such elements are made of wire mesh and of sinter-bonded wire mesh such as is described in U.S. Patents Nos. 2,925,650 and 3,049,796. Also useful are filter elements made of sinter-bonded metal particles, such as sheets of porous stainless steel and other stainless alloys, bronze, aluminum and steel. Any of the materials described above for use in the primary filter element can also be employed for the secondary filter element, but with a larger pore diameter so as to remove only the larger incident particles, for the required greater flow capacity.

The secondary element also preferably is formed in pleats, convolutions or corrugations, for greater surface area.

Figure 1:
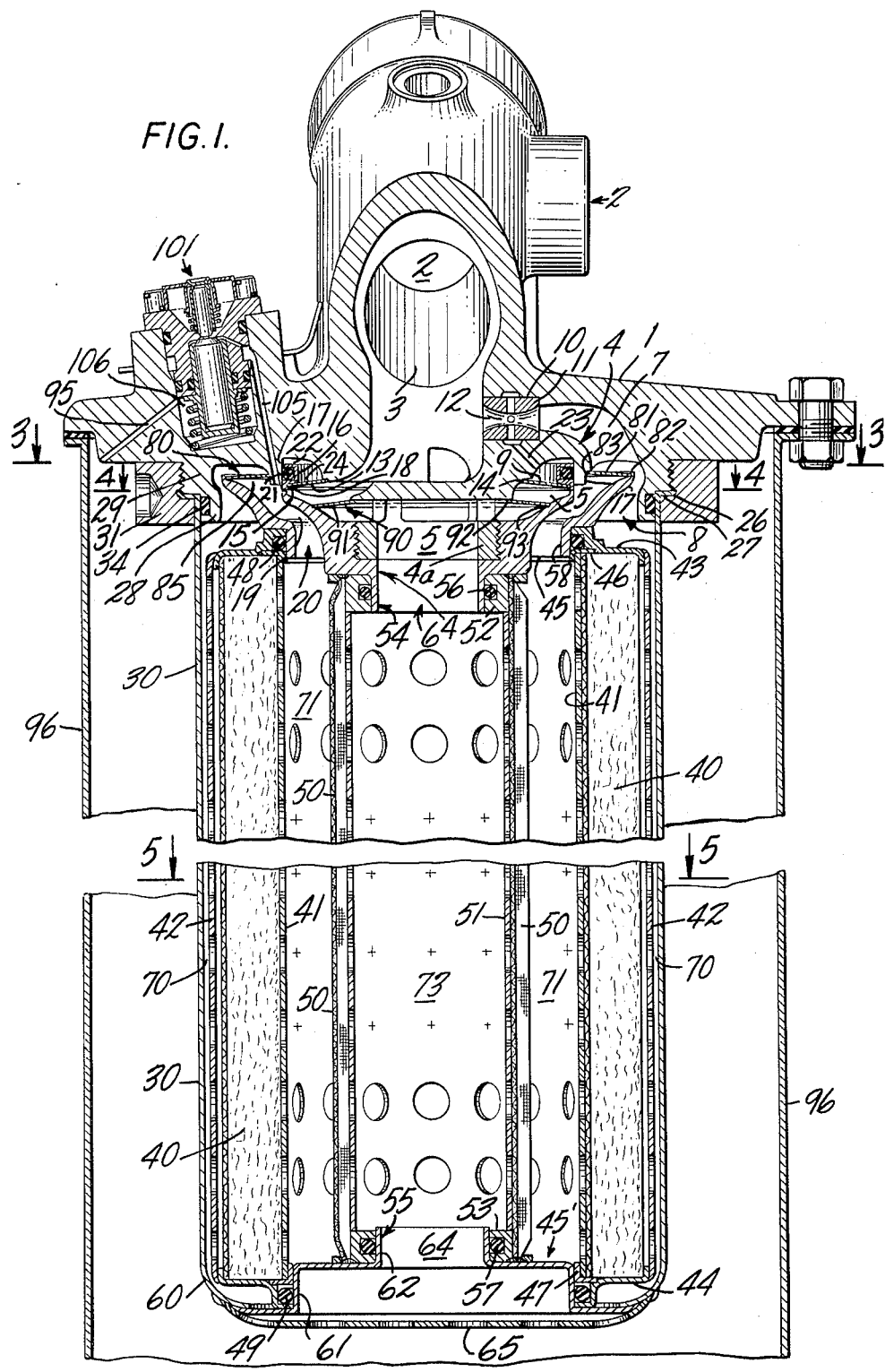
FIGURE 1 is a longitudinal section through a filter assembly or unit in accordance with the invention, showing the filter head and filter bowl, and the elements disposed therein.
Figure 4:
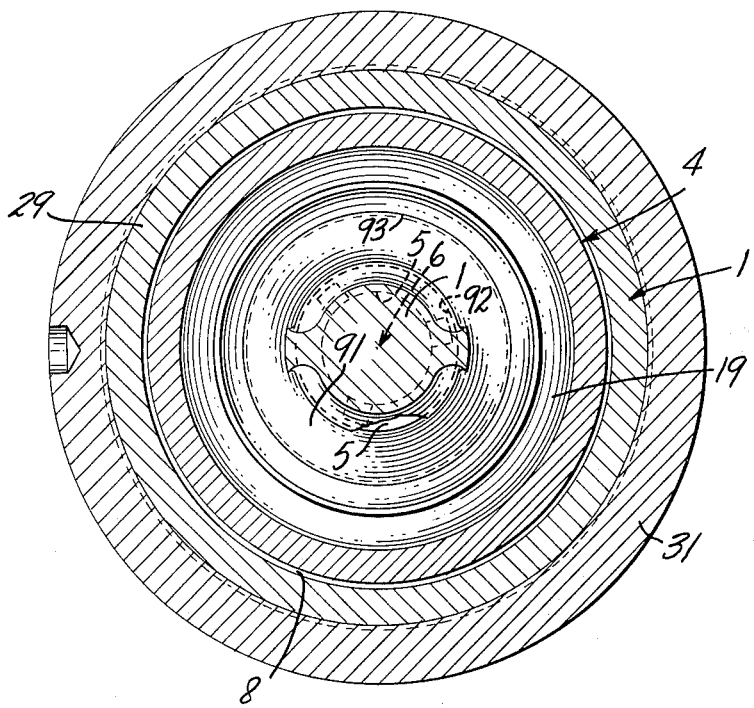
FIGURE 4 is a cross-sectional view through a lower portion of the head of the filter unit of FIGURE 1, taken along the line 4—4 and looking in the direction of the arrows.
Figure 2:
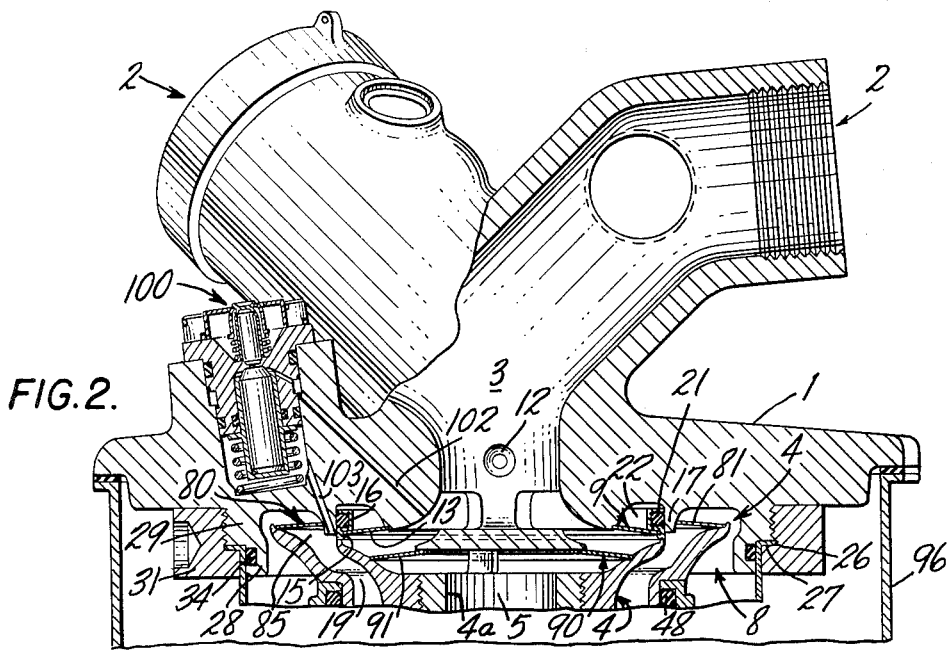
FIGURE 2 is a longitudinal-sectional view of the top portion through the head of the filter unit of FIGURE 1.

The filter unit shown in the drawings comprises a head 1 provided with a threaded inlet port 2 fitted with suitable pipe connections. Port 2 leads to an internal passage 3, and threadably inserted on downwardly extending nipple 4a of the head 1 at the end of passage 3 is an adapter 4 supporting three pressure-sensitive valves of the spring disc or Belleville washer type controlling flow from passage 3 through a variety of selected paths, as will presently be seen. Adapter 4 has an internal passage 5, which extends downwardly to a port 6, at the lower face of the adapter, and is closed off by the relief valve 90. A passage 19 leads off passage 5 of the adapter to a port 20 at the lower face of the adapter, and entry thereto from passage 5 is closed off by the pressure-sensitive valve 9, a part of the flow valve assembly of the invention.

Opening off one side of the inner end of the passage 3 is a socket 10 of the head, and disposed therein is a venturi insert 11 having a central venturi passage 12, opening on its inlet side into passage 3 of the head, and on the outlet side into passage 7 in the head. Passage 7 extends first laterally and then downwardly, leading to a port 8 on the lower face of the head. Within the adapter 4 is a pressure chamber 22, having an open bottom 24. The chamber 22 is connected by passage 23 to the center of the venturi passage 12 of the adapter, so that the static pressure in the chamber 22 is always equal to the static pressure at the venturi, with consequences to be detailed later.

The open bottom end of the pressure chamber 22 is closed off by the pressure-sensitive valve 9, which is composed of the Belleville washer or spring disc 13, the inner periphery of which is located in recess 14 formed in the lower face of the head 1, and the outer periphery of which fits in a circumferential recess 15 of gland 16. The gland 16 fits snugly against a side wall 17 of the pressure chamber 22, and reciprocates up and down therein with flexing of the disc 13. In the lowermost position, the gland 16 seats against a valve seat 18 on an upper face of the adapter 4. Thus, entry of fluid from passage 5 into passage 19 normally is prevented by gland 16 when in the closed position against valve seat 18. When the gland 16 is moved away from the seat 18, by flexing of disc 13, passage 19 is opened to flow of fluid from the inlet passage 3 through passages 5 and 19 to port 20.

A leak-proof seal between the gland 16 and the side wall 17 of chamber 22 in which the gland reciprocates is provided by O-ring seal 21.

The head 1 has a downwardly extending nipple 28, provided with an outwardly extending outside-threaded lip 29, and to this lip is attached a filter bowl 30 by means of the internally threaded ring clamp 31, threadably held on the lip 29, and supporting the upper lip 26 of the bowl on the flange 27, thus providing easy removal of the filter bowl from the head. A leak-proof seal is provided between the side of lip 26 of the filter bowl and the lower face of lip 29 of the head nipple 28 by means of the O-ring seal 34.

Figure 3:
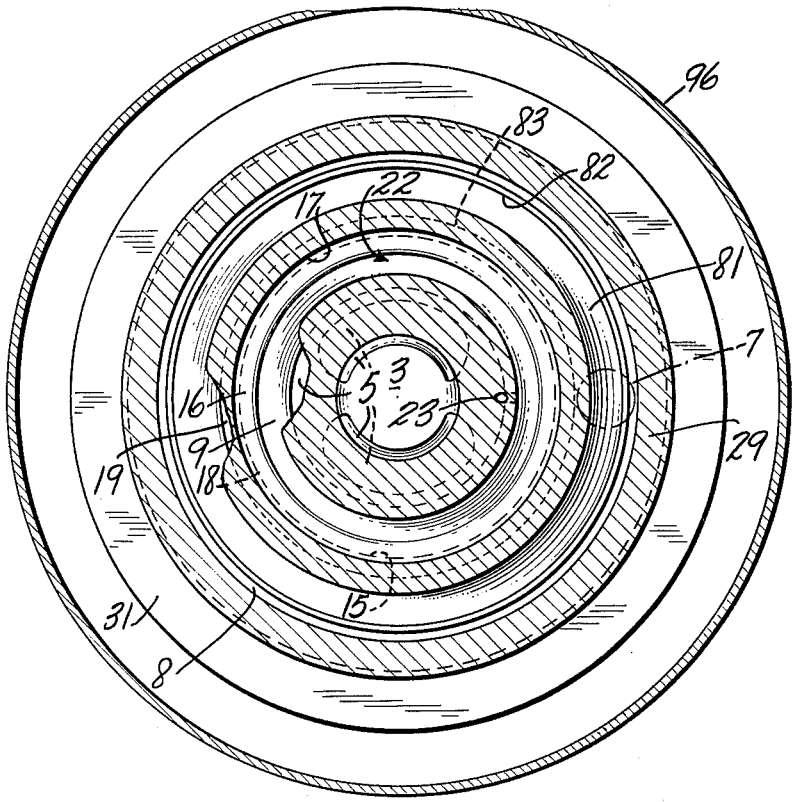
FIGURE 3 is a cross-sectional view of the filter unit of FIGURE 1, taken along the lines 3—3 and looking in the direction of the arrows.
Figure 5:
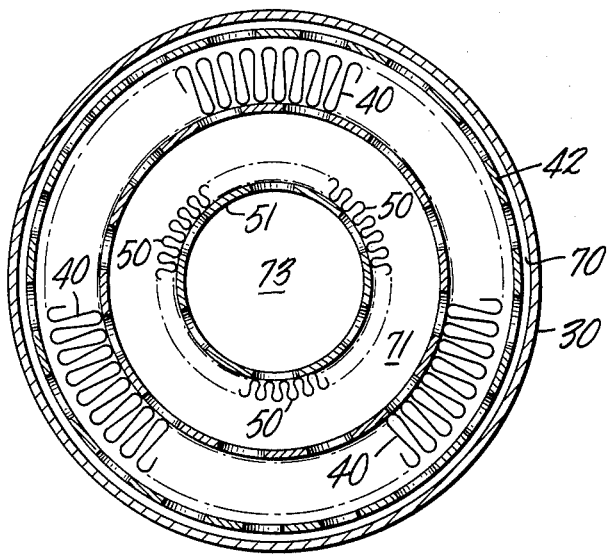
FIGURE 5 is a cross-section of the bowl portion of the filter unit of FIGURE 1, taken along the line 5—5 and looking in the direction of the arrows.

Disposed in the bowl 30 are a primary filter element 40, and a secondary filter element 50. The filter element 40 is formed of any filter material capable of removing 98% of all particles having a diameter as low as 0.45 micron. The element shown in the drawing is made of a preferred filter material, cellulose paper, epoxy resin impregnated, and coated with a blend of glass fibers, diatomaceous earth and potassium titanate, prepared as described in U.S. applications Serial No. 98,595, filed March 27, 1961, and now U.S. Patent No. 3,238,056, and Serial No. 215,151, filed August 6, 1962. Also useful are the filter elements described and claimed in U.S. application Serial No. 74,130, filed December 6, 1960, and now U.S. Patent No. 3,158,532. The material is in corrugated form, as is best seen in FIGURE 3. The corrugations are supported both within and without by cylindrical perforated cores of sheet metal, such as aluminum or stainless steel, the inner core being designated 41 and the outer core 42. Thus, both surfaces of the primary element 40 are supported and protected by a metal covering.

The assembly of the corrugated filter and two cores is held between upper and lower end caps 43 and 44, respectively. Each of the end caps 43 and 44 is provided with a central aperture 45 and 45', respectively, defined by the inwardly turned inner periphery of each end cap. Abutting the central aperture are end pieces 46 and 47, respectively, which are bonded to the end caps, and turned outwardly and then laterally, to form with the caps the grooves within which are captured O-rings 48 and 49.

The opening in the lower end cap 44 fits snugly over and is closed off by the bottom portion 60 of the filter bowl 30. The portion 60 has an upwardly extending stepped re-entrant portion 61, fitting tightly within the opening of the end cap 44, and engaging the inner periphery of the end cap and of the inner piece 47. A leak-proof seal with the portion 61 is formed by the O-ring 49. The portion 61 terminates at its inner periphery in an inwardly extending flanged portion 62 surrounding a central aperture serving as an outlet port 64 for filtered fluid from the bowl. The portion 62 also serves as a support for the secondary filter element 50.

Secured to bottom portion 60 of the bowl below the opening 64 is a diffuser plate 65, which prevents churning of the filtered fluid flow, which is delivered thence to the storage tank 96, and prevents entrapment of air in the hydraulic fluid in the tank due to churning of the fluid in the tank.

The adapter 4 is threadably supported by the externally threaded nipple 4a of head 1, and locates the opening 45 in the top end cap 43 and end piece 46, by means of the downwardly extended nipple 58. The O-ring seal 48 provides a leak-proof seal between the end cap and the adapter 4. The bottom portion 60 of the bowl holds the cap 44 of the primary filter element 40. Adapter 4 threadably engaged to nipple 4a of head 1 holds the cap 43 of the primary filter element 40, thereby fixing the element in the assembly. As a result, the outer core 42 surrounding primary filter element 40 and the filter bowl 30 define between them a space 70 just inside the wall of the bowl. The port 8 of the head 1 opens into this space, but the only exit is through filter element 40. It is thus evident that fluid entering through the inlet 2, passage 3, passing via venturi fitting 11, passage 7, and port 8 of the head, into the space 70, can only emerge from the bowl 30 by passing through core 42, the primary filter element 40, and core 41, in sequence.

The secondary filter element 50 is concentrically disposed within the inner core 41, at a point spaced therefrom, thereby defining a space 71 between the outer surface of the secondary filter element and the core 41, and enclosing a central passage 73 opening at the lower end into outlet passage 64 of the bowl, and at the top end below the exit port 6 of passage 5 of the adapter 4. The port 20 of passage 19 of the adapter 4 opens into the bowl 30 directly over the space 71.

The secondary filter element is made of a sintered wire mesh, prepared in accordance with U.S. Patents Nos. 2,925,650 and 3,049,796, and having a surface of sinter-bonded fine metal powder, in accordance with U.S. Patent No. 3,061,917. In this case, both the sintered wire mesh and the metal powder are made of stainless steel. This element, which is also in corrugated form, is supported on a perforated metal cylinder core 51 of aluminum or stainless steel, and the resulting composite welded to top and bottom end caps 52 and 53, respectively, in accordance with the process and structure of U.S. Patents Nos. 3,007,579 and 3,007,238. The end caps 52 and 53 each have a central opening 54 and 55, respectively, and are grooved circumferentially at the inner periphery of the opening to capture O-rings 56 and 57. The bottom portion 62 of the bowl fits in the central opening of end cap 53, and adapter 4 fits in the central opening of end cap 52, and together position the secondary element 50 correctly in the bowl 30. The O-ring 56 ensures a fluid-tight seal with adapter 4, and the O-ring 57 a fluid-tight seal with the bottom portion 62.

Two relief valves 80 and 90 are provided in the adapter 4 to by-pass, respectively, passages 70 and 71.

The valve 80 is composed of an annular Belleville washer or spring disc 81, seated on recesses 82 and 83 on the outer face of the adapter 4, at the head of passage 85, leading off passage 7 of the head. The disc 81 in the position shown closes off passage 85.

The spring disc 81 normally is in the position shown, bowed towards the passage 7. Thus, with the spring disc 81 in the position shown, the space 71 outside the secondary filter element 50 is completely closed off from the inlet passage 7 and space 70, and entry of fluid thereto is obtained only by passage through the primary filter element 40. Accordingly, at normal low flow, while the relief valve 80 is closed, fluid from the inlet passages 3 and 7 in order to reach outlet port 64 of the bowl must flow through the primary element 40, and then across space 71 and through the secondary filter element 50 into the space 73. Whenever the spring disc 81 moves away from its seat 82 at the head of passage 85, however, and this occurs at predetermined pressure differentials across the primary filter element 40, between space 70, and spaces 71 and 73, a path is opened directly from passage 7 through passage 85 to passage 71, so that flow can now continue, by-passing the primary filter element 40, to the outlet port 64 of the bowl. At the same time, at all flow volumes above the maximum that can be handled by the venturi 11, flow will continue through passage 5 and open pressure-sensitive valve 9 into passage 19 and thence also into space 71 at port 20. All such flow is filtered only through the secondary filter element 50.

The relief valve 90 is composed of an annular Belleville washer or spring disc 91, supported in passage 5 on the upper face of the adapter 4, and seating on recesses 92 and 93 on the walls of passage 5, at a point shortly before port 6, opening into space 73 of the secondary filter element 50.

The spring disc 91 normally is in the position shown, bowed towards the space 73 within the secondary filter element. The spring disc 91 forms a fluid-tight seal with the recesses 92 and 93 of the walls of passage 5. Thus, with the spring disc 91 in the position shown, direct from inlet passage 3 via passage 5 into space 73 within the secondary filter element 50 is completely closed off, and entry of fluid thereto is obtained only by passage through the secondary filter element 50. Accordingly, while the relief valve assembly 90 is closed, fluid from the primary filter element 40 or via passage 19 in order to reach outlet port 64 of the bowl flows through space 71 and through the secondary filter element 50 into the space 73. Whenever the spring disc 91 moves away from its seat in recess 92, however, and this occurs at predetermined pressure differentials across the secondary filter element 50, between space 71 and space 73, a path is opened directly to outlet port 64 from inlet passages 3 and 5, so that flow can now continue, by-passing the secondary filter element 50, to the outlet port 64 of the bowl. Such flow is an unfiltered flow, in event of an emergency only.

Also provided in the head 1 are two pressure indicators 100 and 101. These indicators preferably are of the magnetic type, as described and claimed in U.S. Patent No. 2,942,572, issued June 28, 1960. Indicator 100 is connected by line 103 to passage 19 of the adapter 4, on the other side of the relief valve assembly 80 and by passage 102 with inlet passage 3 of the head, and thus detects any pressure differential in excess of a predetermined maximum between passages 3 and 19. Inasmuch as during normal operations, passage 3 is directly connected through venturi passage 12 and passage 7 of the head with space 70 on the unfiltered fluid side of the primary filter element 40, and passage 19 is connected directly to space 71 on the other side of the primary filter element 40, pressure indicator 100 detects the pressure differential across the primary filter element 40. Thus, it will give a signal whenever the predetermined pressure differential across this element has been exceeded, indicating that the filter element has been plugged or sufficiently obstructed so as to reduce flow therethrough to below the predetermined minimum.

Pressure indicator 101 is connected by passage 105 to passage 19 of the adapter 4, and thus to the space 71 in the bowl, and by passage 106 to the passage 95 of the head 1 which communicates with the storage tank 96, in which the filter assembly is located. It will thus give a signal whenever a predetermined minimum pressure differential between these two passages has been exceeded. The tank 96 is on the same side of secondary filter element 50 as space 73, and a low pressure in the tank will exist whenever the pressure in 73 is low. Thus, when the secondary filter element 50 becomes plugged, the pressure differential across it reaches the level at which relief valve assembly 90 is opened, so that the indicator 101 gives an indication of plugging of the secondary filter element 50, and the beginning of completely unfiltered flow.

The various paths of flow of fluid through the filter unit under the varying flow rates in the system can now be understood. Normally, at all flow rates below a predetermined maximum, say 5 gallons per minute, fluid to be filtered enters the filter unit at port 2, proceeding through the passage 3 of the head and orifice 12 of the venturi insert 11 to passage 7 of the head, emerging from the head at port 8 into the space 70 between the exterior of the primary filter element and the inner wall of the bowl 30. It then passes through the exterior core 42 of the primary filter element, the primary filter element 40 and the internal core 41, emerging into the space 71 between the primary and secondary filter elements. Next, it passes through the secondary filter element 50 and the core 51 into the space 73 enclosed by the secondary filter element, and then out through the passage 64 of the bowl 30, leaving the filter unit through plate 65, and thence to the tank 96.

Inasmuch as the primary filter element 40 removes the small particles, and the secondary filter element 50 only the large particles, in this normal line of flow the secondary filter element provides no effective contaminant filtering action. It does, however, prevent migration of any material that may become detached from the primary filter element 40, such as loose fibers or particles of bonding resin.

Thus, in normal flow the filter unit removes the maximum proportions of small particles and very few particles which have a diameter in excess of 0.45 micron will pass the filter unit. This efficient operation is obtained at all normal flow rates below the predetermined maximum at which pressure-sensitive valve 9 is actuated.

Whenever a higher flow capacity is required in the system, the pumps operating the fluid will of course be speeded up, and the rate of flow of fluid to the filter unit at inlet 2 will increase. As the rate of flow into the filter unit increases, the velocity of the flow through the venturi 12 of the insert 11 also increases, with the result that the static pressure in the chamber 22 tapping the venturi 12 is decreased. Eventually, the static pressure differential between the venturi 12 and passage 5 reaches a predetermined pressure at which the valve disc 13 is set to open gland 16 is reached, and the gland 16 moves away from the seat 18 at the face of the adapter 4, thus exposing passage 19 thereof to fluid flow. While this is occurring, flow continues through the venturi passage 12 at the normal volume of, say 5 gallons per minute.

Since the volume of flow that can pass through the venturi is strictly limited by the dimensions thereof, accordingly the excess fluid flow now passes through passage 19, and emerges therefrom at port 20 into the space 71 between the primary and secondary filter elements, and thus the excess flow by-passes the primary filter element 40, and, passing through only the secondary filter element 50, emerges into the passage 73 enclosed by the secondary filter element, leaving the filter bowl 30 at port 64. In the course of such flow, it is thoroughly mixed with the filtered flow which continues to pass through the primary filter element 40. The fluid now delivered by the filter unit to the system is therefore composed of fluid passing through the primary filter element and thus effectively stripped of most particles more than 0.45 micron in diameter, together with flow passing only through the secondary filter element, and stripped only of most particles in excess of 1.5 microns in diameter.

The system can tolerate such a mixed flow for a considerable period of time, but as a matter of fact this flow is continued only for so long as the excess flow demand is made upon the system. As soon as the flow demand diminishes, and the volume of fluid and rate of flow is restored to normal, the pressure upon the pressure-sensitive valve 9 is correspondingly decreased. The velocity of flow through the orifice also decreases proportionately, and the static pressure in chamber 22 once again increases, and returns to normal. When the static pressure differential across the valve between passage 19 and chamber 22 has been reduced to below that at which the valve disc 13 flexes and gland 16 is opened, the gland is returned to its seat 18 under the pressure of the spring disc 13. Passage 19 is accordingly closed off, and all flow by-passing the primary filter element ceases. All the filtered flow accordingly is subjected to the action of the primary filter element 40, and substantially all particles in the system larger than 0.45 micron in diameter are now removed. Since all of the fluid circulating in the system is eventually recirculated through the primary filter element, any particles which may have escaped the secondary filter element because they are smaller than can be removed thereby, that is, any having a particle size within the range from 1.5 microns down to 0.45 micron, will now be removed from the fluid by the action of the primary filter element. Thus, the presence of such particles in the fluid is only temporary, during the period of excess flow requirements.

In the course of use, as the amount of material removed by the primary filter element increases, flow through the primary filter element becomes obstructed. As this happens, there results a corresponding increase in the pressure differential across the relief valve assembly 80 between passage 7 and space 70, and passages 85 and 19, which communicate with the space 71 between the primary and secondary filter elements. Eventually the fluid pressure or force applied to the spring disc 81 at the face opposite passage 7 and space 70 exceeds the predetermined pressure at which the disc will open, and the disc is then pushed away from the seat 83 on the head, thus exposing passages 85 and 19 to the flow of fluid from space 70.

At the same time, the valve disc 13 and gland 16 continue to be actuated at flow rates in excess of 5 gallons per minute, and such excess flow continues via passages 5 and 19 past the gland 16 into space 71, blending in passage 19 at the junction with passage 85 with the flow by-passing the primary element 40 from passage 7.

With the plugging of the primary filter element 40, and the corresponding reduction in pressure observed in passage 19, due to the flow connections 102 and 103 on each side of the differential pressure indicator 100, this change in pressure between passages 3 and 19 is detected by the indicator, which, at a pressure differential at or just short of the time of opening of the disc 81, signals that the primary filter element is clogged. Thus, the operator is made aware of the condition requiring his attention at or before the time when the secondary filter element is put into service, by-passing the primary filter element. The differential pressure indicator 100 is preferably so set that the signal is given continuously until the filter unit is serviced, since it is important that the flow by-passing the primary filter element not be maintained for any longer length of time than is absolutely necessary.

Flow through the secondary filter element 50 into space 73 will continue until the secondary filter element becomes clogged. In the unlikely event that this should occur, the by-pass valve 90 provides a by-pass around the secondary filter element 50. As the secondary filter element 50 becomes obstructed, due to the removal of contaminants, the pressure differential between spaces 71 and 73 will increase, and eventually it reaches the point ot which the spring disc 91 is forced away from its seat, opening the passage 5 to space 73 directly from inlet 3. At the same time, the change in pressure between the space 71 and space 73 is detected by the pressure indicator 101, which is in communication therewith through passage 105 and through 106 to passage 95. Accordingly, a signal is given at a pressure differential at or just before the pressure differential required to open the spring disc 91. The operator now sees the signals of the two pressure indicators 100 and 101, and knows that both filter elements of the filter unit are out of service, so that servicing of the unit is imperative if satisfactory operation of the hydraulic system is to be continued.

Any type of relief valve can be used in place of the spring discs 81 and 91, such as a poppet and spring type valve.

The spring disc of the invention is in the form of a disc bowed against the direction of flow, and opens fully at a predetermined pressure differential. The flow-through required is provided by so dimensioning the disc and valve seat as to give an annular opening of the predetermined flow capacity when the disc cracks open. Disc thickness, amount of bow, disc diameter and annular opening diameter are determined by the pressure differential to be resisted, i.e., the resistance to be offered by the spring action of the disc, and the flow capacity needed at a given pressure differential.

The spring disc of the invention is made of material of high yield strength and high hardness. Materials having minimum yield strengths of 30,000 to 400,000 p.s.i. can be used, with Rockwell hardness of the order of C–45. Steel, stainless steel, and nickel chromium alloys are satisfactory, as also are certain synthetic resins such as polytetrafluoroethylene and polyoxymethylene. Metal discs surfaced with polymeric synthetic resins or elastomeric compounds to improve seating of the seals also can be used.

The disc can be uniform in thickness throughout or can vary in thickness, thinner at the center than at the edge, to give improved flexing and sealing.

Fluid flow conditions of all kinds can be met by appropriate design of the spring disc to any load-deflection characteristics required in the system. The geometry of these discs is established by the discs' outside diameter and inside diameter, its free height measured from the inside edge (along the perpendicular to the outside edge) and its thickness. Proper selection of the geometry, using mathematical tables and equations of Fortini, Machine Design, September 4, 1958, "Conical-Disc Springs" will give a disc capable of pressure-relieving response to any type of load in any desired way.

The following is claimed:

1. A flow control valve assembly for mounting in a housing having a first line and a second line to control flow in both responsive to changes in flow volume comprising, in combination, a spring disc valve and associated sealing means and a venturi, the spring disc being reciprocable, and biased against a valve seat, the venturi permitting fluid flow in the first line through the venturi at all times, and the spring disc valve being adapted to flex between open and closed positions to open and close off flow to the second line, a pressure chamber closed off by the disc and said sealing means and communicating only with the venturi, the venturi being dimensioned to increase the velocity of flow therethrough from the one side to the other side thereof, and thereby reduce the static pressure at the venturi and in the pressure chamber, and the spring disc being flexed to an open position whenever upon increase in flow and corresponding increase in velocity through the venturi the static pressure in the pressure chamber is reduced to below a predetermined minimum, and thereby open the second line.

2. A flow control valve in accordance with claim 1 wherein the spring disc is mounted on a reciprocable gland, and the gland biased against a valve seat, the gland being reciprocated between open and closed positions with flexing of the spring disc responsive to fluid pressure.

3. A flow control valve in accordance with claim 1 wherein the spring disc is a Belleville washer.

4. A filter assembly is accordance with claim 1 wherein the spring disc is surfaced with a polymer improving seating of the disc in a fluid-tight seal.

5. A full flow filter assembly comprising, in combination, a housing having inlet and outlet passages; a primary filter disposed in the housing; a primary passage leading from the inlet only to the primary filter element; a venturi disposed in the housing across the primary passage to direct all normal flow to and through the primary filter element, the primary filter element receiving fluid in a predetermined quantity for filtration at all times from the venturi, and delivering filtered fluid for delivery at the outlet passage of the housing; a secondary filter element disposed in the housing; a secondary passage leading from the inlet to the secondary filter element, and a pressure-sensitive spring-biased valve disposed across the secondary passage, spaced from the venturi, and normally closing off flow to the secondary filter element through the secondary passage, but responsive to a predetermined excess volume of flow through the venturi to open and allow such excess flow to pass directly to and through the secondary filter element while continuing normal flow to and through the primary filter element via the venturi so that both normal and excess flow through the filter assembly are filtered, and normally no unfiltered flow passes directly to the secondary filter element.

6. A filter assembly in accordance with claim 5 including a relief valve set to open at a predetermined pressure differential across the secondary filter element, bypassing both the primary filter element and the secondary filter element, whenever the secondary filter element becomes obstructed and the pressure differential thereacross is exceeded.

7. A filter assembly in accordance with claim 6 in which the relief valve is in the form of a spring disc valve.

8. A filter assembly in accordance with claim 5 in which the primary filter element has a 0.45 to 3 micron particle removal rating and the secondary filter element has at least a 1.5 micron particle removal rating.

9. A filter assembly in accordance with claim 5 in which the pressure-sensitive valve is in the form of a spring disc valve.

10. A filter assembly in accordance with claim 9 wherein the pressure-sensitive valve comprises a gland normally biased by the spring disc in a position to close off flow of fluid to the secondary filter element.

11. A filter assembly in accordance with claim 9 wherein the spring disc has one surface exposed to inlet fluid pressure and the other surface exposed to fluid pressure at the venturi.

12. A filter assembly in accordance with claim 5 wherein the primary filter element is made of paper surfaced with fibrous material and the secondary filter element is made of sintered wire mesh having a surface of metal particles sinter-bonded thereto.

13. A filter assembly in accordance with claim 5 including a differential pressure indicator for detecting and indicating a pressure differential across the primary filter element greater than a predetermined minimum.

14. A filter assembly in accordance with claim 5 including a differential pressure indicator for detecting and indicating a pressure differential across the secondary filter element greater than a predetermined minimum.

15. A full flow filter assembly comprising, in combination, a housing having inlet and outlet passages; a venturi disposed in the inlet passage; a primary filter element disposed in the housing in a manner such that all normal flow entering the inlet passage first passes through the venturi and then passes to and through the primary filter element, the primary filter element receiving fluid for filtration in a predetermined quantity at all times from the venturi; a secondary filter element in the housing normally receiving filtered flow from the primary element, and disposed in the housing to deliver filtered fluid to the outlet passage of the housing; a secondary passage in the housing leading directly from the inlet passage to the secondary filter element to bypass the primary filter element; a pressure sensitive spring disc valve disposed across and normally closing off the secondary passage, being exposed on one side to inlet fluid pressure; a passage in the housing communicating fluid pressure at the venturi to the other side of the spring disc, the pressure sensitive valve being responsive to a predetermined excess volume of flow through the venturi to open and allow such excess flow to pass directly to and through the secondary filter element, while continuing normal flow to and through the primary filter element via the venturi, so that both normal and excess flow through the filter assembly are filtered and normally no unfiltered flow passes directly to the secondary filter element.

16. A filter assembly in accordance with claim 15 wherein the spring disc is a Belleville washer.

17. A filter assembly in accordance with claim 15 wherein the spring disc is surfaced with a polymer thereby improving seating of the disc in a fluid-tight seal.

References Cited by the Examiner
UNITED STATES PATENTS

| | | | |
|---|---|---|---|
| 2,096,125 | 10/1937 | McDougall | 251—24 X |
| 3,000,505 | 9/1961 | Scavuzzo | 210—444 X |
| 3,040,894 | 6/1962 | Pall | 210—90 |
| 3,120,490 | 2/1964 | Samson | 210—132 |
| 3,164,164 | 1/1965 | Pall et al. | 251—75 X |

REUBEN FRIEDMAN, *Primary Examiner.*

F. W. SPEAR, *Assistant Examiner.*